Jan. 19, 1965     W. A. HERRMANN     3,166,427
POULTRY PROCESSING METHOD
Filed Dec. 27, 1960     2 Sheets-Sheet 1

*INVENTOR.*
WILLI A. HERRMANN
BY
ATTORNEYS

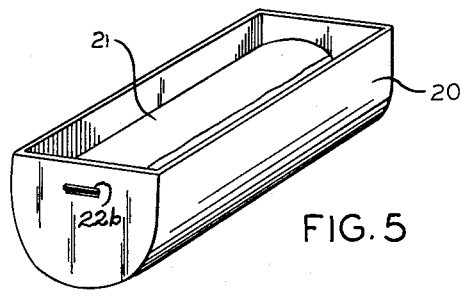
FIG. 5
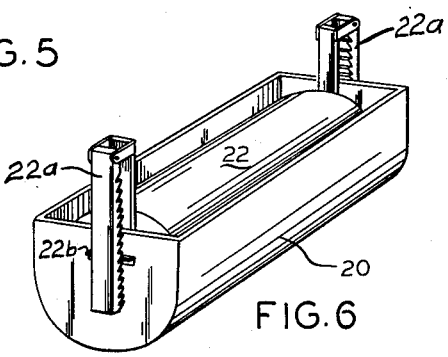
FIG. 6
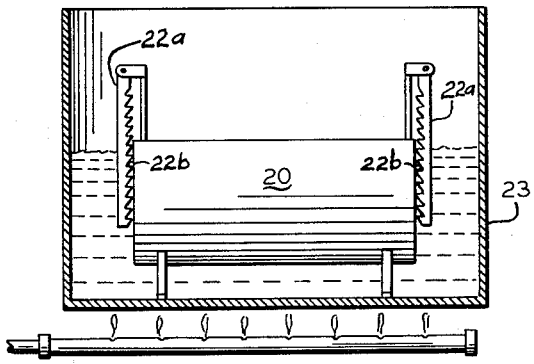
FIG. 7
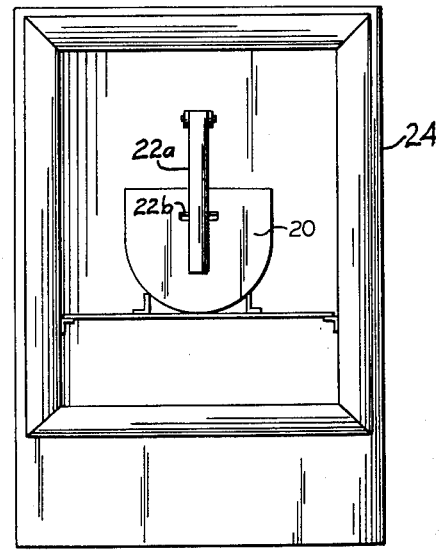
FIG. 8
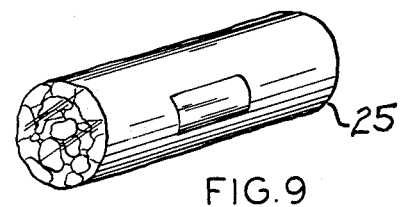
FIG. 9

3,166,427
POULTRY PROCESSING METHOD
Willi A. Herrmann, 4612 W. Pratt Ave., Lincolnwood, Ill.
Filed Dec. 27, 1960, Ser. No. 78,611
4 Claims (Cl. 99—194)

This invention is directed to new and useful improvements in the processing of meat and is particularly concerned with improvements which allow the sale of poultry meat in package form such that it may be stored in a refrigerator for a period of several weeks or more while retaining flavor and texture and at the same time allowing the package to be removed periodically for use as either cold meat or cooked meat.

A major purpose of the present invention is the creation of a process for preparing poultry meat in such a fashion that the meat may be served easily as cold meat or may be heated and then served, the process being such that the meat is packaged without bones, that the meat retains moisture content for a comparatively long period of time in an unfrozen section of a refrigerator with no harsh or "typically preserved" flavor while at the same time being such that tying of meat sections in the completed package is unnecessary.

Other purposes will appear from time to time in the course of the ensuing specification and claims when taken with the accompanying drawings, in which:

FIGURE 5 is a diagrammatic view of another step in the process;

FIGURE 6 is a diagrammatic view of another step in the process;

FIGURE 7 is a diagrammatic view of another step in the process of the present invention;

FIGURE 8 is a diagrammatic view of another step in the process of the present invention; and FIGURE 9 is a perspective view of the completed package from the present invention.

Like elements are designated by like characters throughout the specification and drawings.

Figure 1:
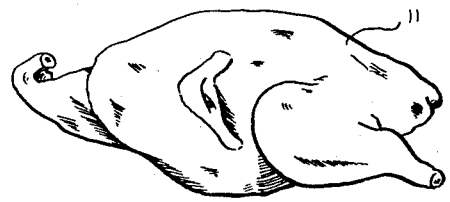
FIGURE 1 is a perspective view of a typical fowl before processing in accordance with the present invention.
Figure 2:
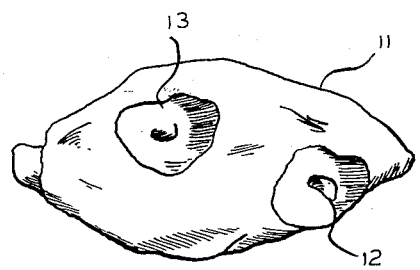
FIGURE 2 is a perspective view of a fowl and treated as a preliminary part of the process of the present invention.
Figure 3:
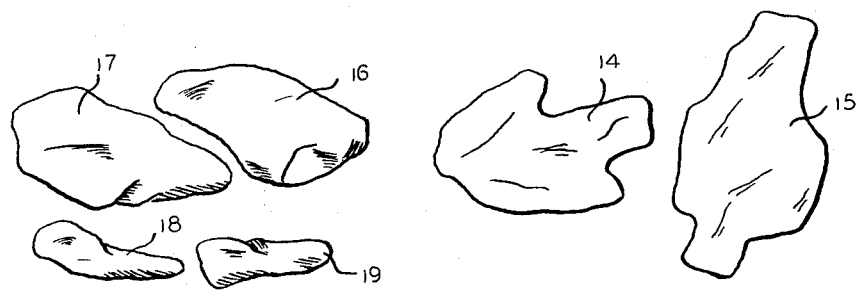
FIGURE 3 is a diagrammatic view of certain portions of the fowl illustrated in FIGURE 2.
Figure 4:
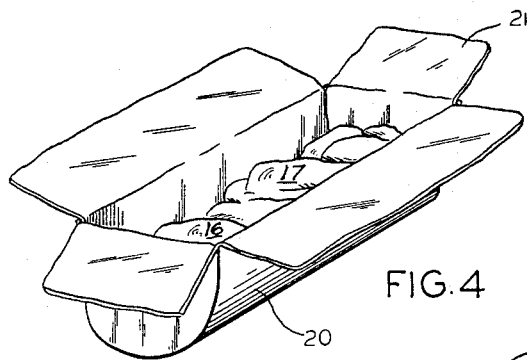
FIGURE 4 is a diagrammatic view of another step in the process.

Referring specifically now to the drawings and in the first instance to FIGURE 1, 11 designates a dressed carcass of poultry which may be, for example, a turkey body. In accordance with the present invention, the limbs of the carcass are first removed as is shown in FIGURE 2, thereby leaving some gaps 12 and 13 in the skin of the bird. The skin of the carcass is then removed. When the skin is desired to be used with the finished product it is desirable to remove the skin in such fashion as to form relatively large sheets as appears diagrammatically at 14 and 15 in FIGURE 3. After skinning the carcass, the major portion of the meat is removed from the bones. For example, the breast of a turkey may be separated from the breast bone and formed into relatively large chunks as appears at 16 and 17 in FIGURE 3. The dark meat of the carcass is also separated from the bones, care being taken to provide as large a section of meat as possible. The dark meat, for example, is designated at 18 and 19 in FIGURE 3. Any portions of the carcass that are not intended to be processed in accordance with the present invention may be then removed from the bird and used for any purpose practical.

It should be understood that in practicing the method of the present invention it is preferred to separate the meat of the bird into just as few chunks or individual pieces as possible.

After the aforementioned relatively large chunks or pieces of meat are separated from the bird, they are placed in a brine solution for soaking. The amount of salt in the brine solution can be varied in accordance with individual tastes and desires, although a salt content of approximately 20% by volume of the solution is satisfactory. Various types of seasonings may be added to the brine solution to also suit individual tastes and desires. After the meat has soaked in the brine solution for a period of time long enough for the brine and seasoning to pass into the meat, the meat is removed from the brine and is thereafter placed in a mold section 20. A sheet of wrapping paper or the like 21 is placed in the lower half of the mold 20 and the brine soaked chunks of meat are placed over this masking sheet of material. A sheet of "Visking" paper of a cellophane type is practical in the process and prevents adherence of the meat to the surface of the mold 20. The wrapping 21 should substantially seal the assembled mass of meat sections from the exterior although a perfect "air tight" seal is unnecessary. If desired, the skin of the carcass, as designated at 14 and 15, may be first wrapped around the chunks of meat after which the masking sheet 21 is wrapped around the completed body of meat thus formed. The skin sections 14 and 15 may be browned by a slight cooking thereof so as to enhance the appearance of the finished product.

After the meat is placed in the lower half of the mold section 20 and the wrapping sheet 21 is disposed therearound as appears in FIGURE 5, the second half of the mold 22 is brought down within the first half of the mold 20 so as to compress the meat into a generally cylindrical form or a form rather elliptical in cross section. Various types of molds may be employed in the process and the showing of the molds 20 and 22 in FIGURES 4-8 is only intended to be representative of one type of mold that is suitable in the process. Furthermore, various shapes of molds are possible so as to compress the meat into other shapes. For example, square shapes or spherical shapes of molds are quite permissible in the process.

The pressure used in forming the chunks of meat should be such as to form a substantially regular shape of the composite assembled meat body without destroying the fibrous and cellular nature of the meat. Pressures in the range of 30 to 70 pounds total force exerted on mold sections approximately 1 foot long with a width of 5 inches are satisfactory. Locking devices 22a and 22b on the mold sections may be used to maintain the pressure of the mold on the meat mass therein.

After the two mold sections are placed together, the completed mold is then placed in a cooking vessel 23 as appears in FIGURE 7. As shown in FIGURE 7, the cooking vessel contains a body of water which is then brought to a temperature in the range of approximately 170° F. to a boiling temperature. The mold and the meat are left in the cooking vessel 23 under the pressure of the mold sections until the internal temperature of the meat reaches approximately 160° F. At this point the mold is removed from the cooking vessel 23 and placed in a refrigerator as at 24 in FIGURE 8 until a 40° F. internal temperature of the molded meat is attained, the mold still holding the mass under pressure. Thereafter the molded meat is removed from the mold, the Visking paper may be removed, and the meat is subjected to temperatures below freezing and for a period of time sufficient to freeze the meat.

Before or after freezing the formed body of meat, the meat may be packaged as appears at 25 in FIGURE 9. After packaging and freezing the meat is ready for the consumer and is preferably maintained frozen until purchased by the consumer.

In use of the completed package, the consumer may leave the package in an unfrozen section of a refrigerator at normal refrigerator temperatures which may be on the order of approximately 40° F. The meat may be sliced off the roll for use as cold meat or may be warmed or subjected to some cooking process to allow the serving thereof as cooked meat.

The meat thus formed may be packaged as packages of all white meat, all dark meat or a mixed package of white and dark meat.

In use the product has a flavor susbtantially the same as roast turkey. No tying of individual meat sections together is required. The juices of the meat are retained for an extremely long period of time in a refrigerator.

As formed, the meat maintains its molded form when kept in the conventional refrigerator and does not fall apart during use thereof.

In a typical example of the process, the dressed carcass of a turkey has the limbs removed therefrom as appears in FIGURE 2. The skin of the turkey is then removed. The breast meat of the turkey is then removed from the breast bone in relatively large chunks which, for purposes of this example, may be assumed to be four separate chunks.

The breast meat thus removed is then soaked in a brine solution having a content of 20% salt by volume for twenty hours. The meat is then removed from the solution and disposed within a wrapper of visking paper so that the paper completely surrounds and covers the meat. The meat is arranged so that it approximates an elliptical form in cross section. The wrapped package is then placed in a lower section of a mold, the upper section is then brought over the lower section as appears in FIGURE 6, and the two mold sections are brought together so as to compress the meat into the aforesaid shape. The mold with the compressed meat therein is then inserted in a vessel of water at a temperature of 190° F. The temperature of this water is maintained and the mold is left in the cooking vessel until an internal meat temperature of 160° F. is attained. This heat is insufficient to cause charring, browning or discoloration of the meat sections.

The mold is then removed from the vessel and placed in a refrigerator 24 until the internal temperature of the meat reaches 40° F. When this temperature is reached, the two mold halves are separated, the wrapped meat is removed from the mold and the wrapper is removed from the meat. The meat is then wrapped in a saleable wrapper, as appears in FIGURE 9, and frozen.

After freezing the completed package is ready for sale and consumption.

Whereas I have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:

1. The process for preparing a ready to eat boneless package of poultry including the steps of removing the skin and limbs from a poultry carcass and separating the meat of the carcass into relatively large sections, soaking several such meat sections in a brine solution having a salt content of approximately twenty percent by volume of the solution and for a period of time long enough for the solution to pass into the meat sections, the time being on the order of 20 hours soaking time for a brine solution having a salt content of approximately 20 percent by volume of the solution, bringing the sections together to form a single mass of the sections, compressing the sections into a shape of a regular order with the pressure being such as to produce said shape without destroying the fibrous and cellular nature of the meat, subjecting the mass in said shape and under said compression to a temperature such that it causes the internal temperature of the sections to reach 160° F., the temperature of the heat to which the mass is subjected being equal to that produced by water at a temperature of approximately 170° F. to boiling temperature, removing said mass after said internal temperature is reached and thereafter subjecting said mass while maintaining said compression to lower temperatures until an internal meat temperature of 40° F. is attained, and thereafter freezing said sections in said shape.

2. The process for preparing a ready to eat bone-less package of poultry including the steps of removing the skin and limbs from a poultry carcass and separating the meat of the carcass into relatively large sections, soaking several such meat sections in a brine solution for a time sufficient for the solution to pass into said sections, the brine content and soaking time being equivalent to that produced by soaking in a solution having a salt content of twenty percent of salt by volume for a period of approximately twenty hours, bringing the sections together to form a single mass of the sections, compressing the sections into a shape of a regular order with the pressure being such as to produce said shape without destroying the fibrous and cellular nature of the meat, subjecting the mass in said shape and under said compression to a temperature such that it causes the internal temperature of the sections to reach 160° F., the temperature of the heat to which the mass is subjected being equal to that produced by water at a temperature of approximately 170° F. to boiling temperature, removing said mass after said internal temperature is reached and thereafter subjecting said mass while maintaining said compression to lower temperatures until an internal meat temperature of 40° F. is attained, and thereafter freezing said sections in said shape.

3. The method of claim 2 wherein said sections are wrapped in paper before compression thereof and before said shape is subjected to said elevated temperatures, and maintained in said paper until said lower internal temperature of 40° F. is reached.

4. The method of claim 2 wherein said sections are wrapped in relatively large sections of the removed skin of said carcass and left completely wrapped in a sheet of visking paper, the wrapping of said sections being performed after said sections are soaked in said brine solution and before said sections are molded and subjected to said elevated temperature.

References Cited in the file of this patent

UNITED STATES PATENTS

| | | |
|---|---|---|
| 2,640,779 | George | June 2, 1953 |
| 2,779,681 | Sell et al. | Jan. 29, 1957 |
| 2,808,335 | Pierce | Oct. 1, 1957 |
| 2,853,389 | Luchese | Sept. 23, 1958 |